US010634281B2

(12) United States Patent
Schramm

(10) Patent No.: US 10,634,281 B2
(45) Date of Patent: Apr. 28, 2020

(54) CAST-IN-PLACE ANCHOR ASSEMBLY

(71) Applicant: Black & Decker Inc., New Britain, CT (US)

(72) Inventor: Benjamin Schramm, Eppenrod (DE)

(73) Assignee: BLACK & DECKER INC., New Britain, CT (US)

( * ) Notice: Subject to any disclaimer, the term of this patent is extended or adjusted under 35 U.S.C. 154(b) by 92 days.

(21) Appl. No.: 16/002,099

(22) Filed: Jun. 7, 2018

(65) Prior Publication Data

US 2018/0356033 A1 Dec. 13, 2018

(30) Foreign Application Priority Data

Jun. 12, 2017 (EP) .................................. 17175455

(51) Int. Cl.
| | | |
|---|---|---|
| F16B 13/08 | (2006.01) | |
| F16M 13/02 | (2006.01) | |
| E04B 1/41 | (2006.01) | |
| E04B 5/40 | (2006.01) | |

(52) U.S. Cl.
CPC ......... *F16M 13/027* (2013.01); *E04B 1/4121* (2013.01); *E04B 5/40* (2013.01); *F16B 13/08* (2013.01); *F16B 13/0858* (2013.01); *F16B 13/0866* (2013.01)

(58) Field of Classification Search
CPC ....... F16M 13/027; E04B 1/4121; E04B 5/40; F16B 13/08; F16B 13/0858
USPC .......................... 411/44, 80.1, 80.5, 80.6, 82
See application file for complete search history.

(56) References Cited

U.S. PATENT DOCUMENTS

| | | | | | |
|---|---|---|---|---|---|
| 3,769,774 | A | * | 11/1973 | Barnes ................... | E04B 1/4157 52/698 |
| 3,843,080 | A | * | 10/1974 | Imai .......................... | E04B 9/18 248/58 |
| 4,083,162 | A | * | 4/1978 | Regan .................... | E04B 1/4121 249/94 |
| 4,763,396 | A | * | 8/1988 | Fischer ................... | B25B 31/00 29/458 |
| 4,770,583 | A | * | 9/1988 | Lindberg ................ | F16B 13/08 411/340 |
| 5,205,690 | A | * | 4/1993 | Roth ...................... | E04B 1/4121 411/180 |
| 5,568,711 | A | * | 10/1996 | Popp ......................... | E01B 9/10 405/259.5 |

(Continued)

*Primary Examiner* — Roberta S Delisle

(74) *Attorney, Agent, or Firm* — Kofi A. Schulterbrandt; Michael P. Leary

(57) ABSTRACT

A anchor is disclosed for suspending objects below a metal deck after concrete setting. The assembly includes an anchor body having a threaded opening, a sleeve mounted to the anchor body and defining a sleeve opening. The opening extends away from the anchor body. The sleeve also has a flexible portion that elastically flexes upon insertion of the sleeve through a hole in a metal deck. The sleeve is narrower than the width of the flexible portion. The anchor also includes a support defining a supporting channel through which the anchor body extends and that is configured to permit sliding movement, but restrict tilting movement, of the support relative to the anchor body. Also included is a spring for biasing the support along the anchor body towards the sleeve so that opposite sides of a metal deck are clamped between the support and the flexible portion of the sleeve.

14 Claims, 7 Drawing Sheets

(56) References Cited

U.S. PATENT DOCUMENTS

| | | | |
|---|---|---|---|
| 6,240,697 B1 * | 6/2001 | Thompson | E04B 1/4121 |
| | | | 52/698 |
| 8,186,918 B2 * | 5/2012 | Bucquet | F16B 13/143 |
| | | | 411/38 |
| 9,556,895 B2 * | 1/2017 | Jung | F16B 33/002 |
| 9,567,741 B2 * | 2/2017 | Espinosa | E04B 1/4164 |
| 10,400,440 B2 * | 9/2019 | Espinosa | E04B 1/4157 |
| 2015/0184373 A1 * | 7/2015 | Espinosa | E04B 1/4164 |
| | | | 52/701 |

* cited by examiner

US 10,634,281 B2

CAST-IN-PLACE ANCHOR ASSEMBLY

CROSS-REFERENCE TO RELATED APPLICATIONS

This application claims priority from EP Patent Application No. EP17175455.9, filed Jun. 12, 2017, the disclosure of which is incorporated herein by reference in its entirety.

FIELD

This specification relates to a cast-in-place anchor assembly for suspending objects below a metal deck after concrete pouring and concrete setting.

BACKGROUND

The Bang-It®+product is a cast-in-place anchor assembly available for purchase and aspects of the present invention are conceived to improve upon this product.

SUMMARY

According to an aspect of the present invention there is provided a cast-in-place anchor assembly for suspending objects below a metal deck after concrete pouring and concrete setting, the anchor assembly comprising: an anchor body having a threaded opening extending partially through it along an axis; a sleeve mounted to the anchor body and defining a sleeve opening which extends away from the anchor body along said axis, the sleeve also having a flexible portion that is configured to elastically flex upon insertion of the sleeve through a hole in a metal deck that is narrower than the width of the flexible portion; a support defining a supporting channel through which the anchor body extends and that is configured to permit sliding movement, but restrict tilting movement, of the support relative to the anchor body; and a spring for biasing the support along the anchor body towards the sleeve so that, in use, opposite sides of a metal deck are clamped between the support and the flexible portion of the sleeve.

The support may have a planar surface portion for engaging a metal deck in use and the supporting channel may extend away from the planar surface portion in a direction along the length of the anchor body.

The supporting channel may define an inner surface corresponding in shape to the outer surface of the anchor body.

The supporting channel may be reinforced by reinforcing features of the support, optionally by a plurality of ribs.

The anchor body may be provided with at least one feature on its outer surface which the sleeve cooperates with for mounting to the anchor body and wherein the support may have features biased against the anchor body which are configured, during manufacture of the anchor assembly, to cooperate with the at least one feature provided on the outer surface of the anchor body for retaining the support and spring in connection with the anchor body prior to mounting of the sleeve to the anchor body.

The features of the support which are biased against the anchor body may be inwardly extending clips.

Features of the sleeve that cooperate with the at least one feature provided on the outer surface of the anchor body for mounting the sleeve to the anchor body may each have a ramped surface for assisting in decoupling of the sleeve from a mould during manufacture.

The at least one feature provided on the outer surface of the anchor body may be a recess, which is optionally an annular recess.

The anchor body may be partially received within the sleeve, the sleeve having an edge portion in engagement with an edge of the anchor body that defines an entrance to the threaded opening for assisting in correctly mounting the sleeve to the anchor body during manufacture.

The flexible portion of the sleeve may comprise a plurality of elastically deformable fingers. The fingers may have a variable thickness along their respective lengths. The fingers may decrease in thickness along their respective lengths.

The sleeve may comprise a cover section inside the sleeve opening adjacent the entrance thereto such that a threaded bolt can be inserted partially along the sleeve opening before engaging the cover section.

The cover section may comprise a plurality of inwardly extending flaps.

The sleeve may define a plurality of slots adjacent the entrance to the sleeve opening thereby defining a plurality of castellations and the flaps may extend inwardly from respective castellations.

BRIEF DESCRIPTION OF THE DRAWINGS

Embodiments will now be described by way of non-limiting example with reference to the accompanying drawings in which.

DETAILED DESCRIPTION

Figure 1:
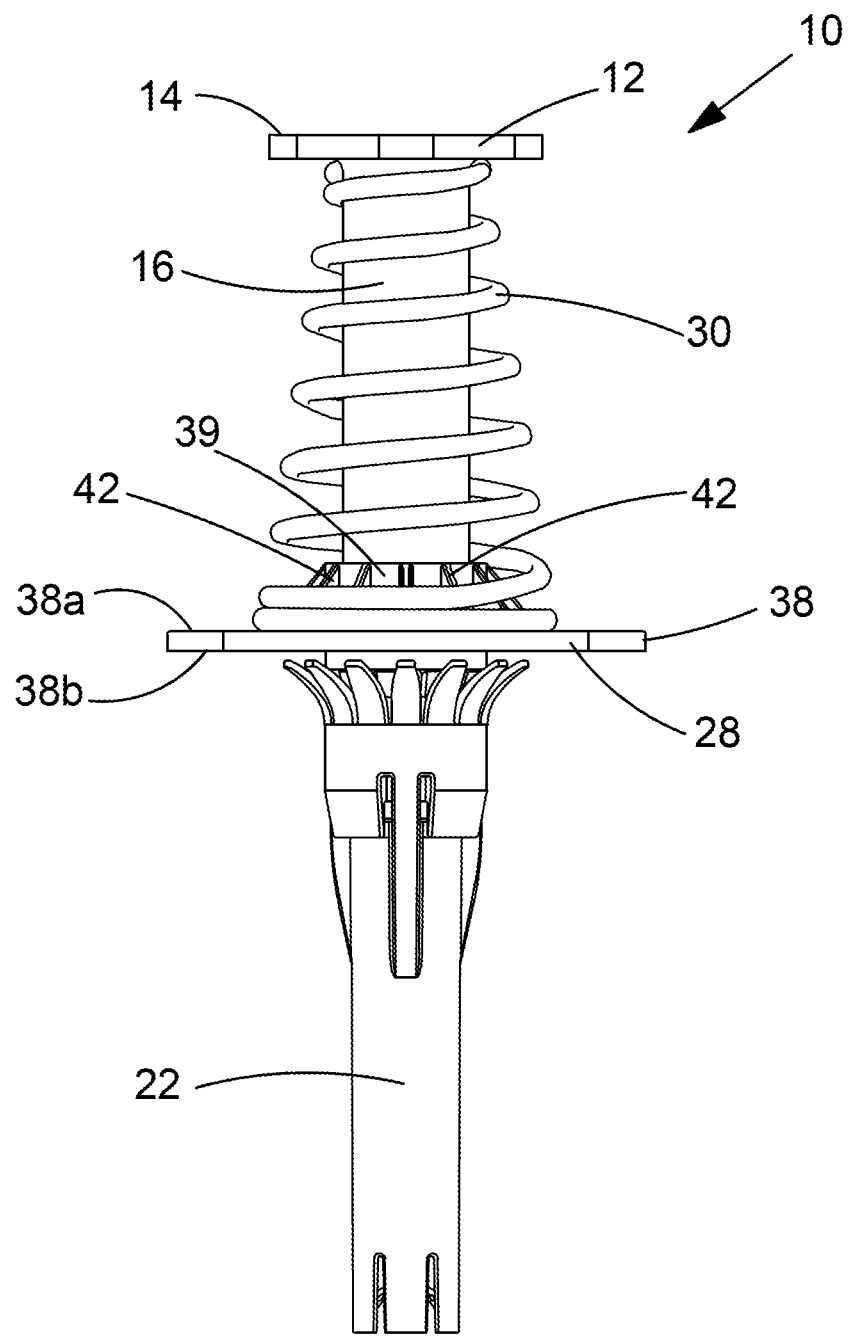
FIG. 1 is a schematic plan view of an anchor assembly according to a first embodiment.
Figure 2:
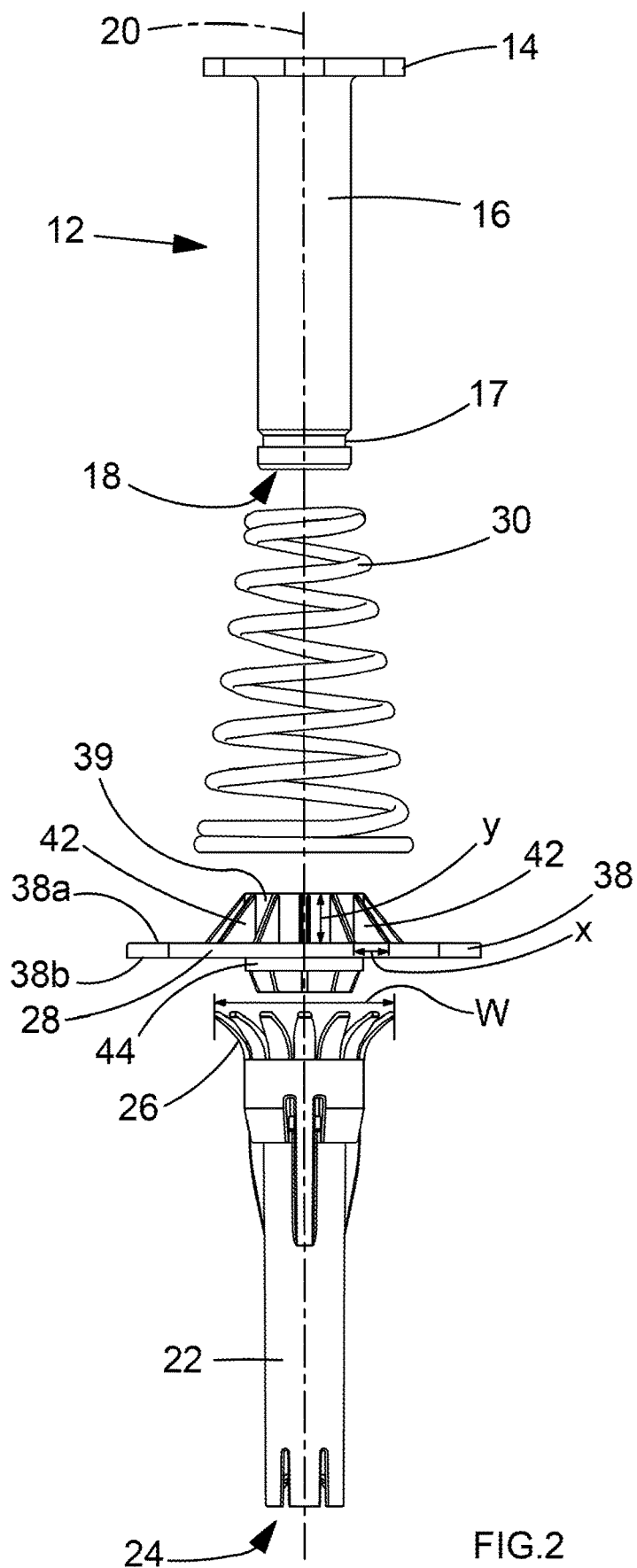
FIG. 2 is a schematic exploded view of the anchor assembly in FIG. 1.
Figure 3:
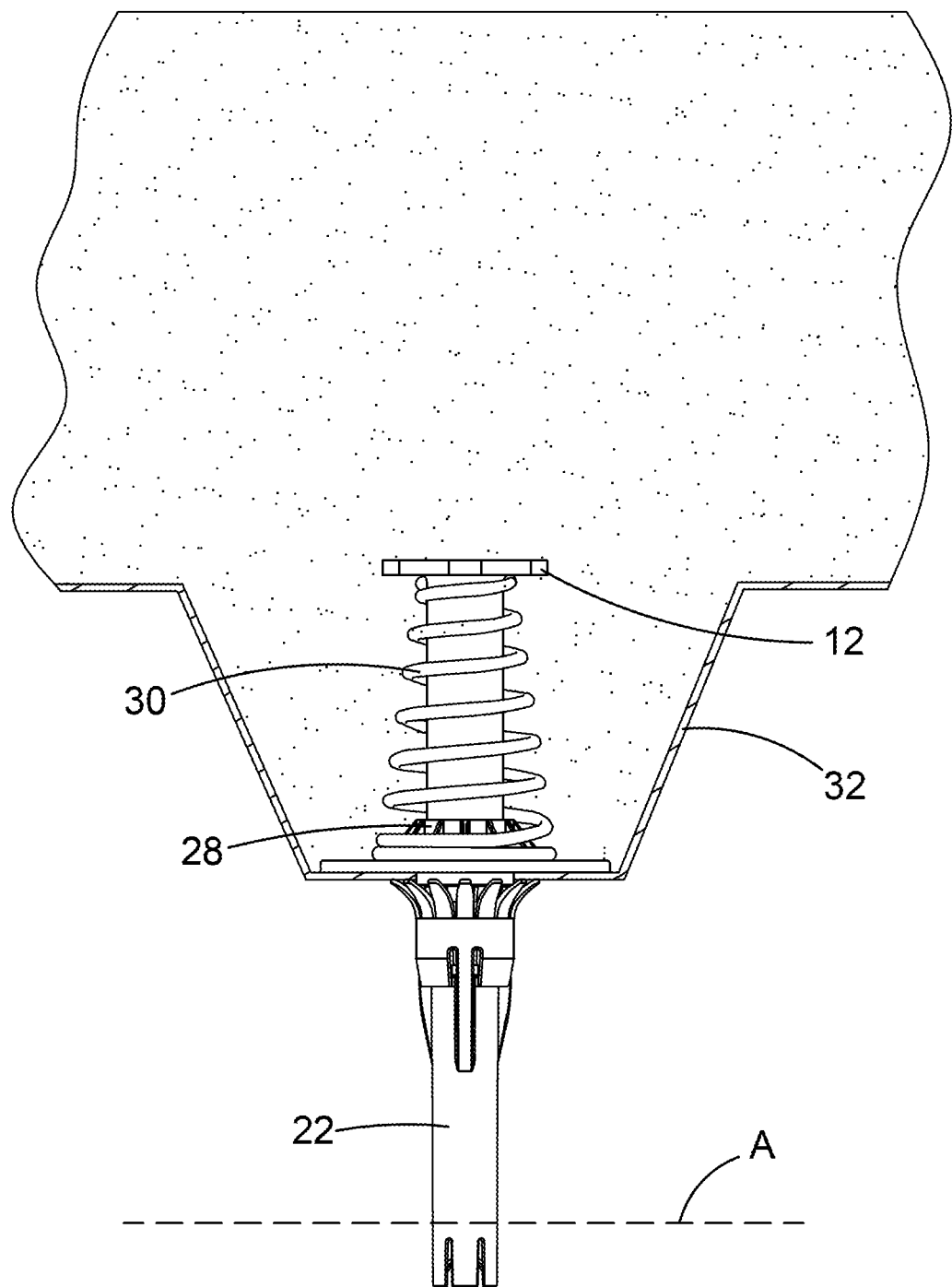
FIG. 3 is a schematic view of the anchor assembly in FIG. 1 in use.

A cast-in-place anchor assembly 10 for suspending objects below a metal deck after concrete is poured onto the metal deck is illustrated in FIGS. 1 and 2. An anchor body 12 has a head portion 14 and a shank portion 16. A threaded bore 18 extends partially through the shank portion 16 along an axis 20. Additionally an annular recess 17 is provided in the outer surface of the anchor body 12. In use when concrete has set around the anchor body 12 (see FIG. 3) a load can be suspended from it via threaded engagement with the internal bore 18. Other features of the anchor assembly 10 assist in mounting the anchor body 12 to a metal deck and holding it in place prior to concrete pouring and during concrete setting.

For instance a sleeve 22 cooperates with the annular recess 17 for mounting the sleeve 22 to the anchor body 12. A sleeve opening 24 extends through the sleeve 22 away from the anchor body 12 in alignment with the internal threaded bore 18. An outwardly protruding flexible portion 26 of the sleeve 22 is configured to elastically flex upon insertion of the sleeve 22 through a hole in a metal deck that is narrower than the width W of the flexible portion 26. Between the sleeve 22 and head portion 14 of the anchor body 12 is provided a support 28 and a spring 30 which biases the support 28 towards the sleeve 22. The spring 30 is conical whereby the narrow end contacts the head portion 14 of the anchor body 12 and the widest part contacts with the support 28. As mentioned when the sleeve 22 is urged through a hole in a metal deck 32 which is narrower than the width W of the flexible portion 26, then the flexible portion 26 will deform to enable insertion through the hole but will return to its original shape after passing therethrough. From FIG. 3 it will be apparent that following such insertion the action of the spring 30 biasing the support 28 towards the sleeve 22 causes the metal deck 32 to be clamped between the support 28 and the flexible portion 26 of the sleeve 22. This maintains the anchor body 12 in an upright orientation relative to the metal deck 32 during concrete pouring and setting.

Features of the anchor assembly 10 will now be described in more detail.

The support 28 has a planar portion 38 which extends outwardly along a direction perpendicular to the aforementioned axis 20, wherein the shank portion 16 of the anchor body 12 extends through an opening 34 in the planar portion 38. An upper planar surface portion 38*a* faces the head portion 14 of the anchor body 12 and lower planar surface portion 38*b* faces the sleeve 22. The lower planar surface portion 38*b* is configured for substantially flush engagement with a metal deck in use (see FIG. 3).

Figure 4A:
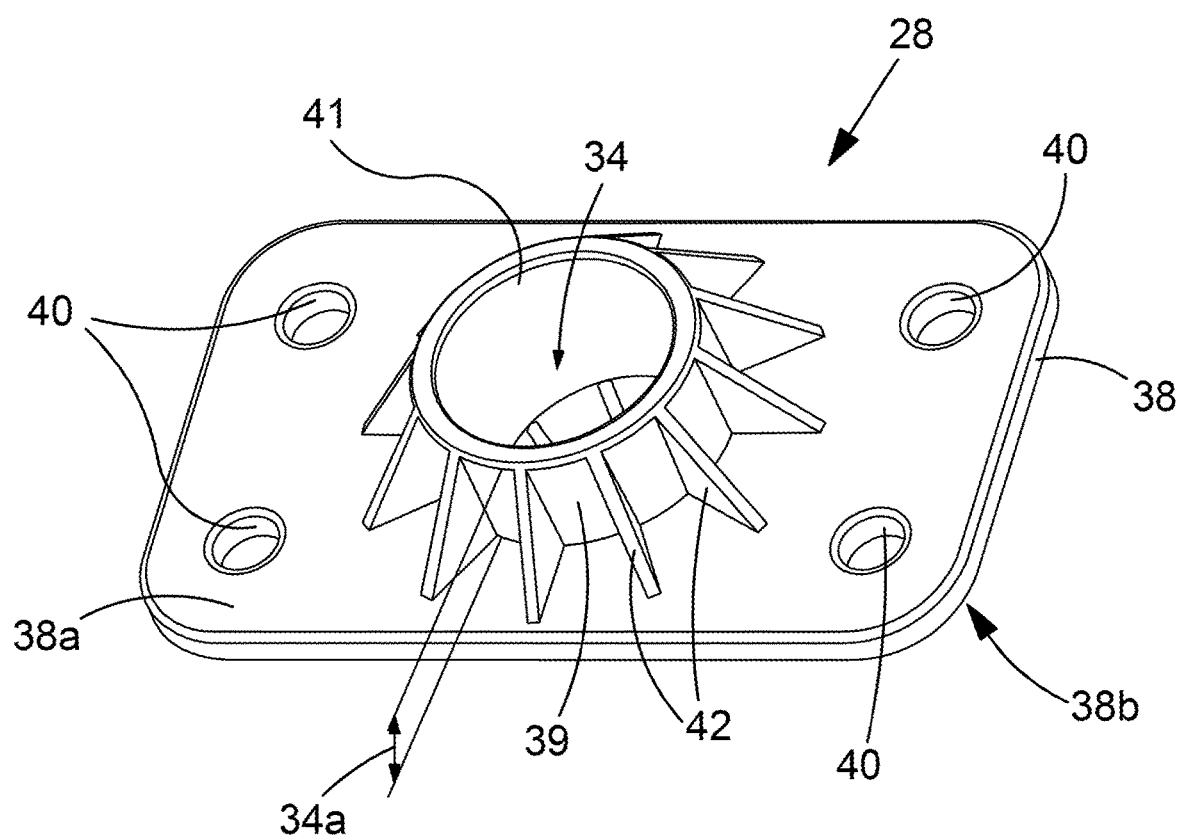
FIGS. 4a and 4b are schematic upper and lower views of the support of the anchor assembly in FIG. 1.
Figure 4B:
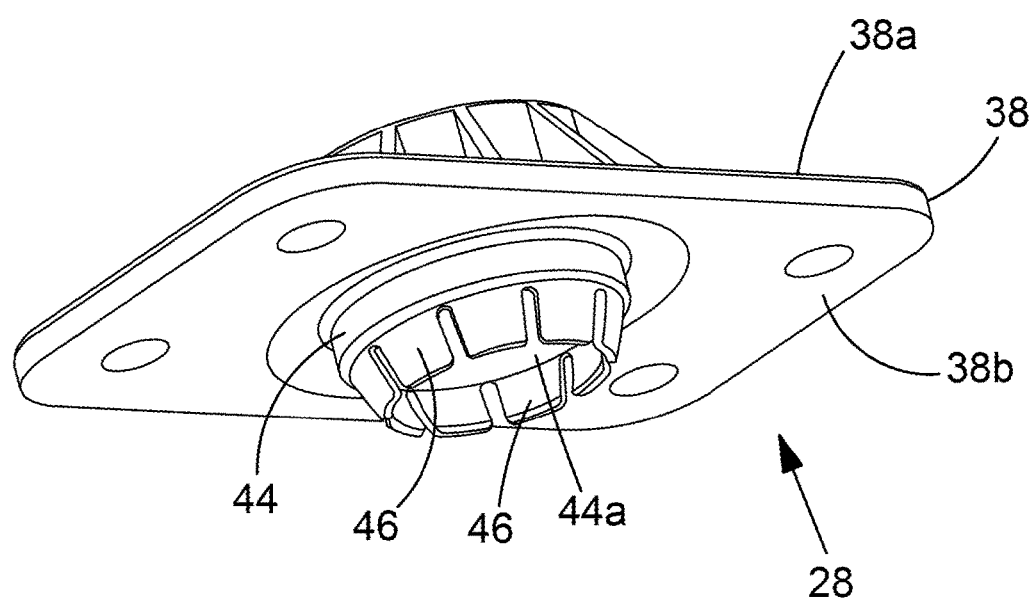

Looking at FIGS. 4*a* and 4*b* in particular the planar portion 38 of the support 28 is substantially rectangular and has a plurality of openings 40 extending through it adjacent the corner sections thereof. These openings 40 are provided so that the support 28 can be fixed to a metal deck by fasteners (e.g. screws) if the hole in the deck through which the anchor assembly 10 is caused to extend in use is wider than the width W of the outwardly protruding flexible portion 26 of the sleeve 22, in which case the anchor assembly 10 cannot clamp the metal deck between the support 28 and outwardly protruding flexible portion 26 of the sleeve 22 like in FIG. 3.

The aforementioned opening 34 through the planar portion 38 co-aligns with the centre of the planar portion 38. With continued reference to FIGS. 4*a* and 4*b* a guide portion 39 of the support 28 is provided around the upper rim of the opening 34 and extends upwards away from the upper planar surface portion 38*a* along the axis 20. More specifically this guide portion 39 defines a supporting channel 34*a* having an inner surface 41 with a cross section that corresponds in shape to the outer cross section the shank 16 of the anchor body 12. In the particular embodiment illustrated the shank 16 is cylindrical and so the supporting channel 34*a* is correspondingly cylindrical and configured to receive the shank 16. This enables sliding movement of the support 28 relative to the shank 16 of the anchor body 12 but restricts tilting movement of the support 28 relative to the shank 16 of the anchor body 12.

Additionally, a plurality of ribs 42 are provided for reinforcing the supporting channel 34*a* to restrict flexing of the guide portion 39. The ribs 42 extend between the upper planar surface portion 38*a* and the exterior surface of the guide portion 39. In more detail the ribs 42 extend a distance x along the upper planar surface portion 38*a* and a distance y along the exterior surface of the guide portion 39 (see FIG. 2), wherein y is identical to the length of the guide portion 39. In other words, the ribs 42 extend entirely along the length of the guide portion 39 for reinforcing its integrity along its entire length. Looking at FIG. 4*a* in particular, the ribs 42 are circumferentially distributed around the guide portion 39 such that adjacent ribs are equi-distant from each other and wherein the distance x is such that the spring 30 can surround the ribs 42 and engage the upper surface portion 38*a*. In other words the widest end of the spring 30 is configured to surround the arrangement of ribs 42 so that the spring 30 can urge against the upper surface portion 38*a* of the support 38 (see FIG. 1).

The above mentioned supporting channel 34*a* and rib 42 arrangement restricts tilting movement of the anchor body 12 relative to the upper surface of a metal deck once the anchor assembly 10 is installed but prior to concrete pouring. This thus reduces the likelihood of construction workers causing anchor bodies 12 to be misaligned upon accidently kicking them while working on a metal deck prior to concrete pouring.

Referring now to FIG. 4*b* the support 28 includes an annular seat 44 around the lower rim of the opening 34 that extends downwards away from the lower surface portion 38*b* along the axis 20. This annular seat 44 has an inner surface 44*a* with a cross section that corresponds in shape to the outer cross section the shank 16 of the anchor body 12. A plurality of clips 46 extend from the annular seat 44 which in the embodiment illustrated resemble a plurality of castellations and so will be referred to as castellations hereafter. The castellations 46 are circumferentially distributed around the annular seat 44 such that adjacent castellations 46 are equi-distant from each other. Furthermore the castellations 46 are configured to curve inwardly across the face of the opening 34 and supporting channel 34*a* through which the shank 16 of the anchor body 12 extends.

It is here mentioned that the inner surfaces 41, 44*a* of the guide portion 39 and the annular seat 44 are contiguous, that is they extend into one another. In another manner of speaking the guide portion 39 and annular seat 44 can be thought of as separate sections of a cylindrical portion, an upper part of which (i.e. the guide portion 39) extends from the upper rim of the opening 34 and the lower part of which (i.e. the annular seat 44) extends from the lower rim of the opening 34.

The purpose of the above mentioned castellations 46 is as follows. During manufacture of the anchor assembly 10 in FIG. 1, the spring 30 is provided around the shank 16 of the anchor body 12. Subsequently the support 28 is caused to surround the shank 16 of the anchor body 12. Compressing the spring 30 by urging the support 28 along the length of the shank 16 loads the spring 30 with potential energy. However, when the tips of the castellations 46 align with the recess 17 in the outer surface of the anchor body 12 they extend into the recess 17. The castellations 46 and recess 17 thus cooperate to resist the compressed spring 30 from urging the support 28 out of engagement with the anchor body 12. This enables the combined arrangement of the anchor body 12, spring 30 and support 28 to be moved around during the manufacturing process without separating. In a factory for instance the combined arrangement of the anchor body 12, spring 30 and support 28 could potentially be passed onto an operative tasked with coupling sleeves 22 to such arrangements and quality checking the final arrangements.

Figure 6:
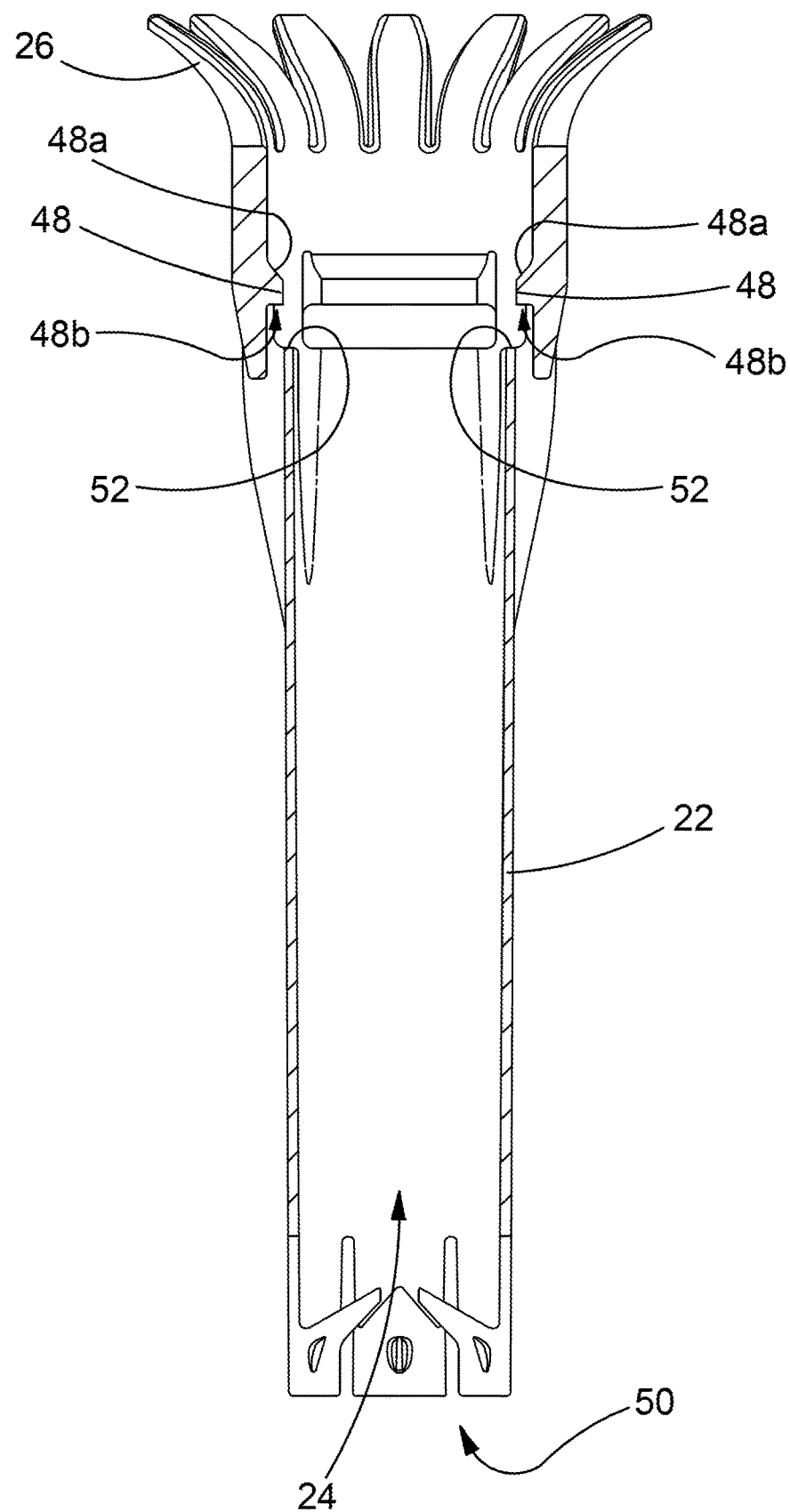
FIG. 6 is a schematic cross sectional view of the sleeve of the anchor assembly in FIG. 1.

To enable coupling of the sleeve 22 to the anchor body 12, the sleeve 22 is provided with a plurality of inwardly extending protrusions 48 as illustrated in FIG. 6. The inwardly extending protrusions 48 each include a ramped surface 48*a* on a side facing the outwardly protruding flexible portion 26. The inwardly extending protrusions 48 also each include a step portion 48*b* on a side facing an entrance 50 to the sleeve opening 24. During manufacture of the anchor assembly 10 in FIG. 1 (once the anchor body 12, spring 30 and support 28 are coupled together) the shank 16 of the anchor body 12 is inserted, via the outwardly protruding flexible portion 26, into the sleeve 22. Engagement of the sleeve 22 and support 28 urges the support 28 further along the shank 16 away from the recess 17. When the inwardly extending protrusions 48 of the sleeve align with the annular recess 17 they extend into it. The step portions 48b cooperate with the recess 17 to resist subsequent separation the sleeve 22 from the shank 16 of the anchor body 12. More specifically due to the spring 30 being compressed it will urge the support 28 into engagement with the sleeve 22, however, cooperation between the inwardly extending step portions 48b and the recess 17 resist the sleeve 22 separating from the shank 16.

Figure 5:
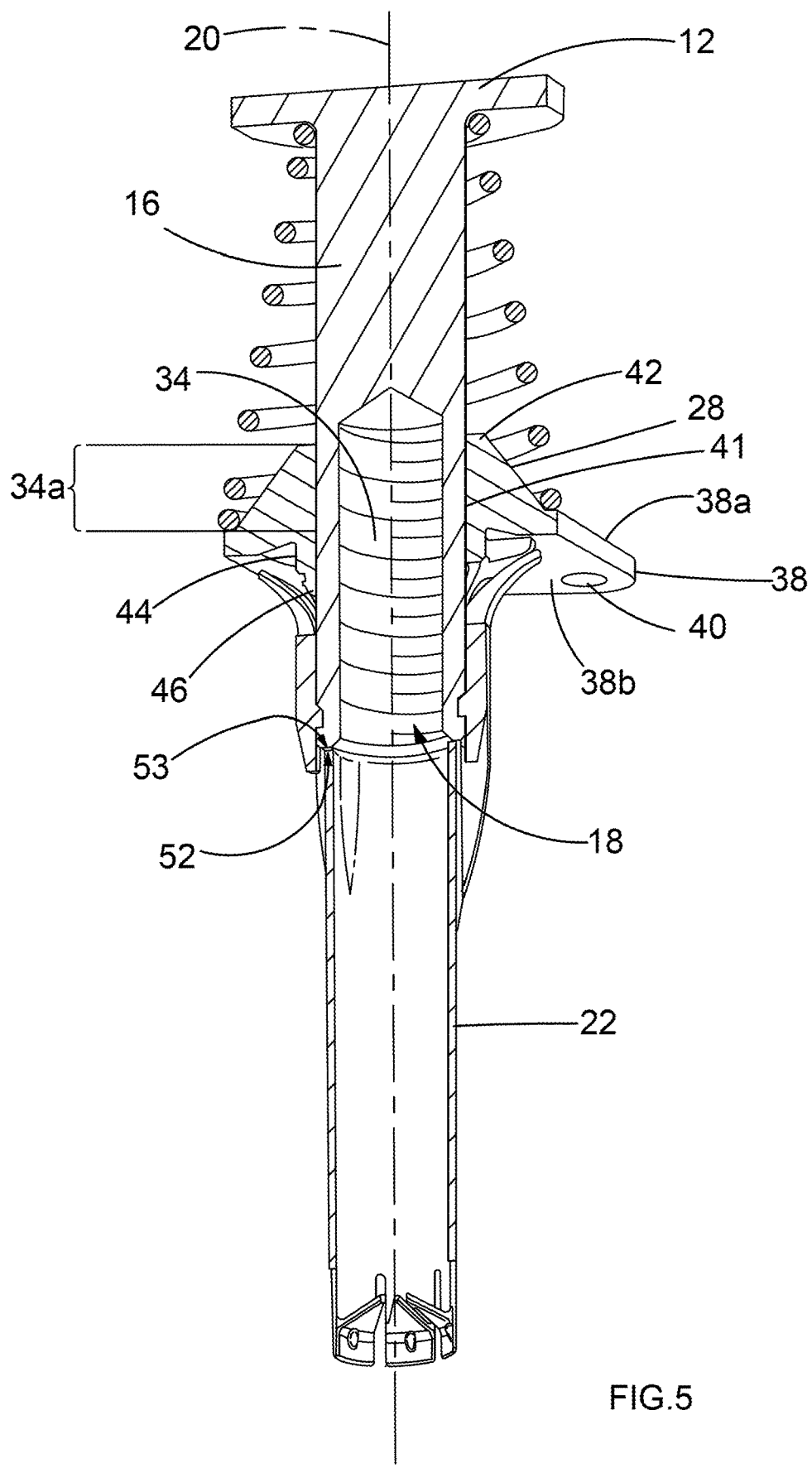
FIG. 5 is a schematic cross sectional view of the anchor assembly in FIG. 1.

The sleeve 22 is additionally provided with an annular blocking edge 52 that is configured to engage an edge of the anchor body 12 defining an entrance to the threaded opening 18 for blocking the sleeve 22 from being pushed too far along the shank 16 during manufacture. To explain this more fully reference is made to FIG. 7. The structure of the sleeve 22 heretofore described is such that it has a primary portion 54 and a head portion 56. The primary portion 54 is tubular, wherein one end of the primary portion 54 forms the aforementioned entrance 50 to the sleeve opening 24 (described in more detail below) and the other end of the primary portion 54 defines the annular blocking edge 52. FIG. 5 illustrates how the annular blocking edge 52 cooperates with the edge 53 of the anchor body 12 defining an entrance to the threaded opening 18 for the purpose of blocking the sleeve 22 from being pushed too far along the shank 16 during manufacture. It will be appreciated from the foregoing that the inwardly extending protrusions 48 of the sleeve 22 described in connection with FIG. 6 extend into the annular recess 17 in the outer surface of the shank 16 when the annular blocking edge 52 of the sleeve cooperates with the edge 53 of the anchor body 12. Movement of the anchor body 12 and sleeve 22 relative to each other is thus restricted in either direction along the axis 20.

Figure 7:
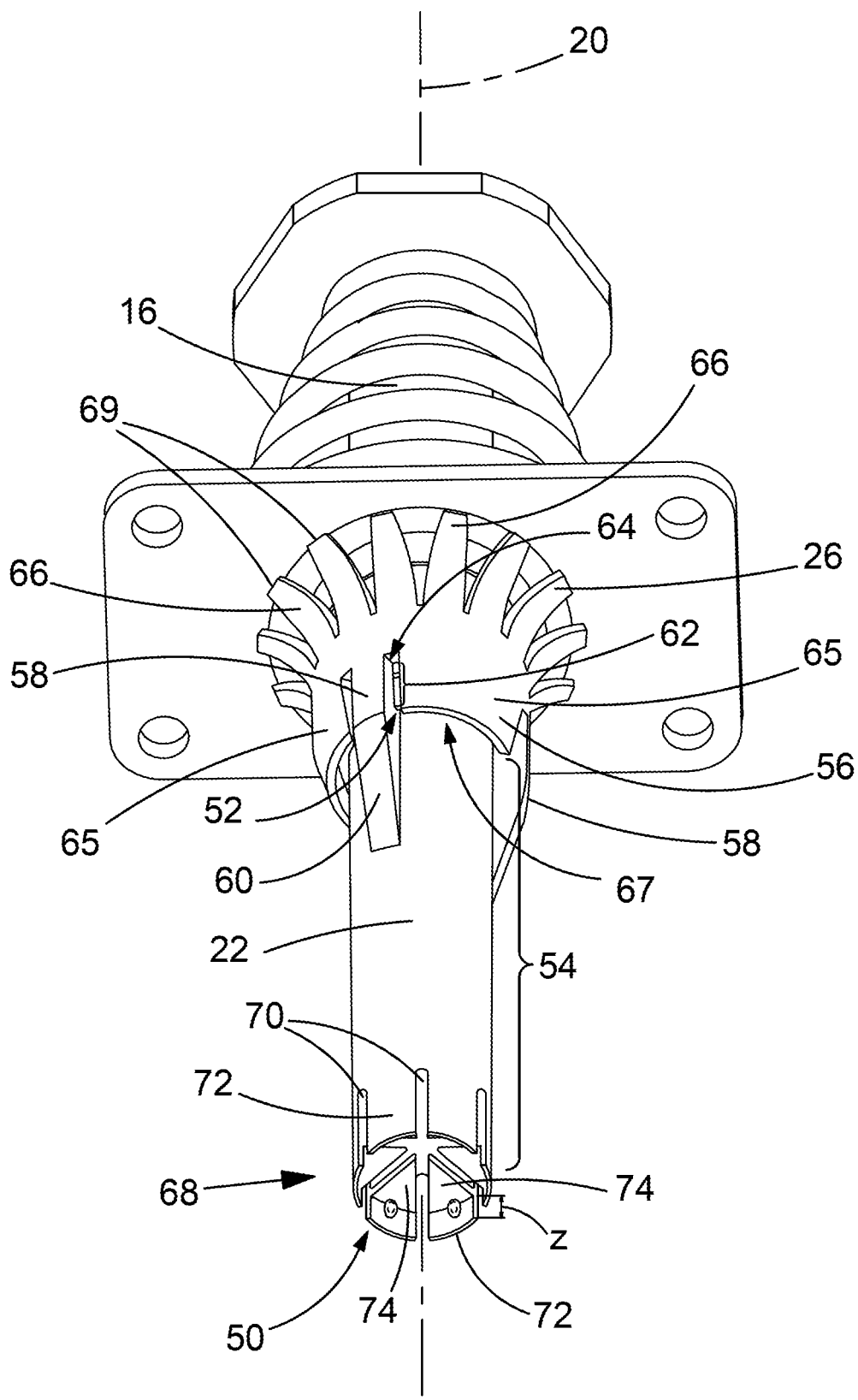
FIG. 7 is a schematic perspective view of the anchor assembly in FIG. 1.

Looking back at FIG. 7 a series of arms 58 couple the head portion 56 of the sleeve 22 to the primary portion 54 of the sleeve 22, the head portion 56 having an opening extending through it which is wider than that extending through the primary portion 54 of the sleeve 22. This is to enable the head portion 56 to surround the shank 16 of the anchor body 12, wherein from the drawings it will be apparent that the inwardly extending protrusions 48 described in connection with FIG. 6 are provided on an inner surface of the head portion 56.

In some embodiments the sleeve 22 has three arms 58 that are circumferentially distributed, although more or fewer such arms 58 could be used instead.

The height of the arms 58 relative to the outer surface of the primary portion 54 of the sleeve 22 increases with increased distance along the axis 20 towards the head portion 56 of the sleeve 22. The arms 58 thus define a ramped portion 60 for assisting in inserting the sleeve 22 through an opening in a metal deck in use. An internal surface of each ramped portion 60 defines part of the heretofore described annular blocking edge 52 (see FIG. 7). A distal section 62 of each respective arm 58, having a flat outer surface, extends into a respective notch 64 of the head portion 56.

It is here mentioned that the inwardly extending protrusions 48 described in connection with FIG. 6 are provided on the sections of the head portion 56 between the respective notches 64, which resemble a plurality of circumferentially distributed teeth portions and so will be referred to hereafter as teeth 65. A gap 67 exists between the inner surface of the teeth 65 and the outer surface of the primary portion 54 of the sleeve 22 which the teeth 65 partially extend over. This enables the teeth 65 to flex relative to the outer surface of the primary portion 54 of the sleeve 22 which makes it easier to couple the sleeve 22 to the anchor body 12 during manufacture. In particular when the shank 16 of the anchor body 12 is inserted into the sleeve 22 as heretofore described, before the annular groove 17 aligns with the inwardly extending protrusions 48 the above mentioned teeth 65 are caused to flex outwards. However when the inwardly extending protrusions 48 do align with the annular groove 17 in the shank 16 the teeth 65 flex back inwards.

With continued reference to FIG. 7 the outwardly protruding flexible portion 26 of the sleeve 22 extends from the head portion 56. A plurality of circumferentially arranged elastically deformable curved fingers 66 form the outwardly protruding flexible portion 26 of the sleeve 22. In the embodiment illustrated, together the outwardly protruding flexible portion 26 and head portion 56 of the sleeve 22 resemble a crown. The fingers 66 have a variable thickness along their respective lengths. In particular the fingers decrease in thickness along their respective lengths, which gives them more flexibility compared to fingers of a similar nature that have the same thickness along their respective lengths. The distal end of the fingers 66 may terminate in an edge 69 rather than continuing to a point, which reduces the risk of user injury.

With yet further reference to FIG. 7 the sleeve 22 comprises a cover section 68 inside the entrance 50 to the sleeve opening 24. A plurality of slots 70 extend from the entrance 50 to the sleeve opening 24 along the sleeve 22 in a direction parallel with the axis 20, thereby defining a plurality of circumferentially distributed castellations 72. The cover section 68 is formed by a plurality of flaps 74 which extend inwardly from the respective castellations 72. Since the flaps 74 are located inwardly a distance z from the entrance 50 to the sleeve opening (i.e. the distal part of the sleeve 22), in use a threaded bolt can be inserted partially along the sleeve opening 24 before engaging the cover section 68. This assists a user in aligning a threaded bolt with the sleeve opening 24 before pushing it along the sleeve 22 into threaded engagement with the internal threaded bore 18 of the anchor body 12. The respective flaps 74 bend when a threaded bolt is urged against them. Furthermore, the slots 70 enable the castellations 72 to flex relative to the main part of the sleeve 22 so that when a threaded bolt is pushed through the cover section 68 it is not solely the flexing of the flaps 74 that enables the bolt to pass through the cover section 68 but the combined flexing of the flaps 74 and castellations 72, which reduces the likelihood of the flaps 74 snapping in use. Prior to such insertion of a threaded bolt however the flaps 74 restrict the ingress of material along the sleeve 22 into contact with the internal bore 18 of the anchor body 12.

Returning to FIG. 3, if insulation for instance is sprayed onto the lower surface of the metal deck 32 the cover section 68 described above restricts the ingress of insulation along the sleeve 22. If the layer of insulation extends from the lower surface of the metal deck 32 to the level denoted A, a user will be able to visually identify the location of the anchor body 12 upon seeing the sleeve 22 protruding from the insulation. As described above they will then be able to pre-align a threaded bolt for suspending a load with the internal bore 18 of the anchor body 12 by inserting the threaded bolt partially into the sleeve 22 and into contact with the flaps 74 forming the cover section 68. Once pre-aligned, the flaps 74 can be bent back by urging the threaded bolt along the sleeve 22 and into contact with anchor body 12. Upon subsequent threaded engagement with the internal bore 18 of the anchor body 12 a load can be suspended from the anchor body 12.

The invention claimed is:

1. A cast-in-place anchor assembly for suspending objects below a metal deck after concrete pouring and concrete setting, the anchor assembly comprising:
   an anchor body having a threaded opening extending partially through it along an axis;
   a sleeve mounted to the anchor body and defining a sleeve opening which extends away from the anchor body along said axis, the sleeve also having a flexible portion that is configured to elastically flex upon insertion of the sleeve through a hole in a metal deck that is narrower than the width of the flexible portion;
   a support defining a supporting channel through which the anchor body extends and that is configured to permit sliding movement, but restrict tilting movement, of the support relative to the anchor body; and
   a spring for biasing the support along the anchor body towards the sleeve so that, in use, opposite sides of a metal deck are clamped between the support and the flexible portion of the sleeve, wherein the support includes a planar portion, the planar portion including planar surface portion for engaging a metal deck in use and the supporting channel extends away from the planar portion in a direction along the length of the anchor body.

2. The anchor assembly of claim 1, wherein the supporting channel defines an inner surface corresponding in shape to the outer surface of the anchor body.

3. The anchor assembly of claim 2, wherein the supporting channel is reinforced by reinforcing features of the support, optionally by a plurality of ribs.

4. The anchor assembly of claim 1, wherein the anchor body is partially received within the sleeve, the sleeve having an edge portion in engagement with an edge of the anchor body that defines an entrance to the threaded opening for assisting in correctly mounting the sleeve to the anchor body during manufacture.

5. The anchor assembly of claim 1, wherein the flexible portion of the sleeve comprises a plurality of elastically deformable fingers.

6. The anchor assembly of claim 5, wherein the fingers have a variable thickness along their respective lengths.

7. The anchor assembly of claim 6, wherein the fingers decrease in thickness along their respective lengths.

8. A cast-in-place anchor assembly for suspending objects below a metal deck after concrete pouring and concrete setting, the anchor assembly comprising:
   an anchor body having a threaded opening extending partially through it along an axis;
   a sleeve mounted to the anchor body and defining a sleeve opening which extends away from the anchor body along said axis, the sleeve also having a flexible portion that is configured to elastically flex upon insertion of the sleeve through a hole in a metal deck that is narrower than the width of the flexible portion;
   a support defining a supporting channel through which the anchor body extends and that is configured to permit sliding movement, but restrict tilting movement, of the support relative to the anchor body; and
   a spring for biasing the support along the anchor body towards the sleeve so that, in use, opposite sides of a metal deck are clamped between the support and the flexible portion of the sleeve, wherein the anchor body is provided with at least one feature on its outer surface which the sleeve cooperates with for mounting to the anchor body and wherein the support has features biased against the anchor body which are configured, during manufacture of the anchor assembly, to cooperate with the at least one feature provided on the outer surface of the anchor body for retaining the support and spring in connection with the anchor body prior to mounting of the sleeve to the anchor body.

9. The anchor assembly of claim 8, wherein the features of the support which are biased against the anchor body are inwardly extending clips.

10. The anchor assembly of claim 8, wherein features of the sleeve that cooperate with the at least one feature provided on the outer surface of the anchor body for mounting the sleeve to the anchor body each have a ramped surface for assisting in decoupling of the sleeve from a mould during manufacture.

11. The anchor assembly of claim 8, wherein the at least one feature provided on the outer surface of the anchor body is a recess, which is optionally an annular recess.

12. A cast-in-place anchor assembly for suspending objects below a metal deck after concrete pouring and concrete setting, the anchor assembly comprising:
   an anchor body having a threaded opening extending partially through it along an axis;
   a sleeve mounted to the anchor body and defining a sleeve opening which extends away from the anchor body along said axis, the sleeve also having a flexible portion that is configured to elastically flex upon insertion of the sleeve through a hole in a metal deck that is narrower than the width of the flexible portion;
   a support defining a supporting channel through which the anchor body extends and that is configured to permit sliding movement, but restrict tilting movement, of the support relative to the anchor body; and
   a spring for biasing the support along the anchor body towards the sleeve so that, in use, opposite sides of a metal deck are clamped between the support and the flexible portion of the sleeve, wherein the sleeve comprises a cover section inside the sleeve opening adjacent the entrance thereto such that a threaded bolt can be inserted partially along the sleeve opening before engaging the cover section.

13. The anchor assembly of claim 12, wherein the cover section comprises a plurality of inwardly extending flaps.

14. The anchor assembly of claim 13, wherein the sleeve defines a plurality of slots adjacent the entrance to the sleeve opening thereby defining a plurality of castellations and the flaps extend inwardly from respective castellations.

* * * * *